May 12, 1931.  J. H. L. GAMBLE  1,805,394
STRADDLE ROW CULTIVATOR
Filed Oct. 10, 1929   2 Sheets-Sheet 1
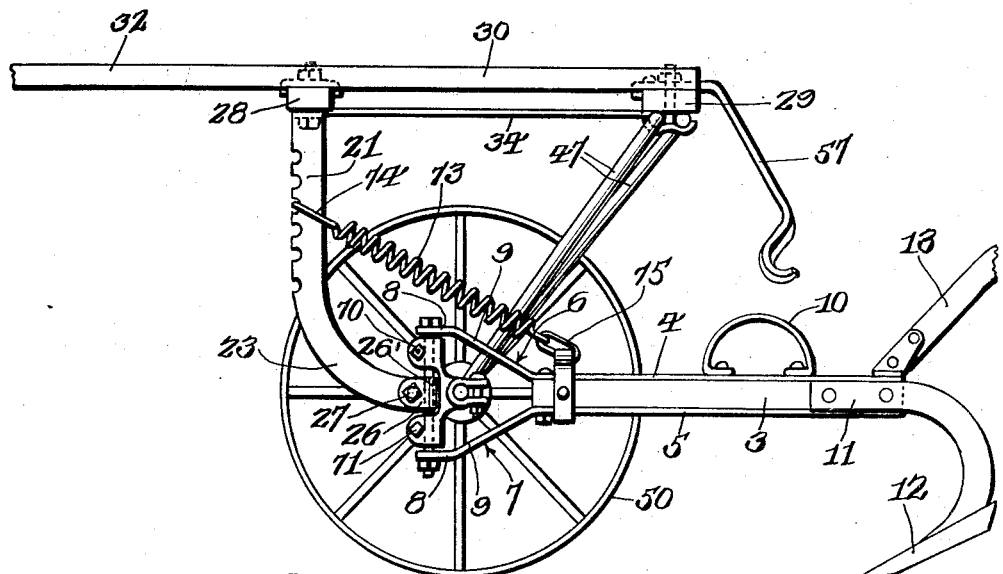
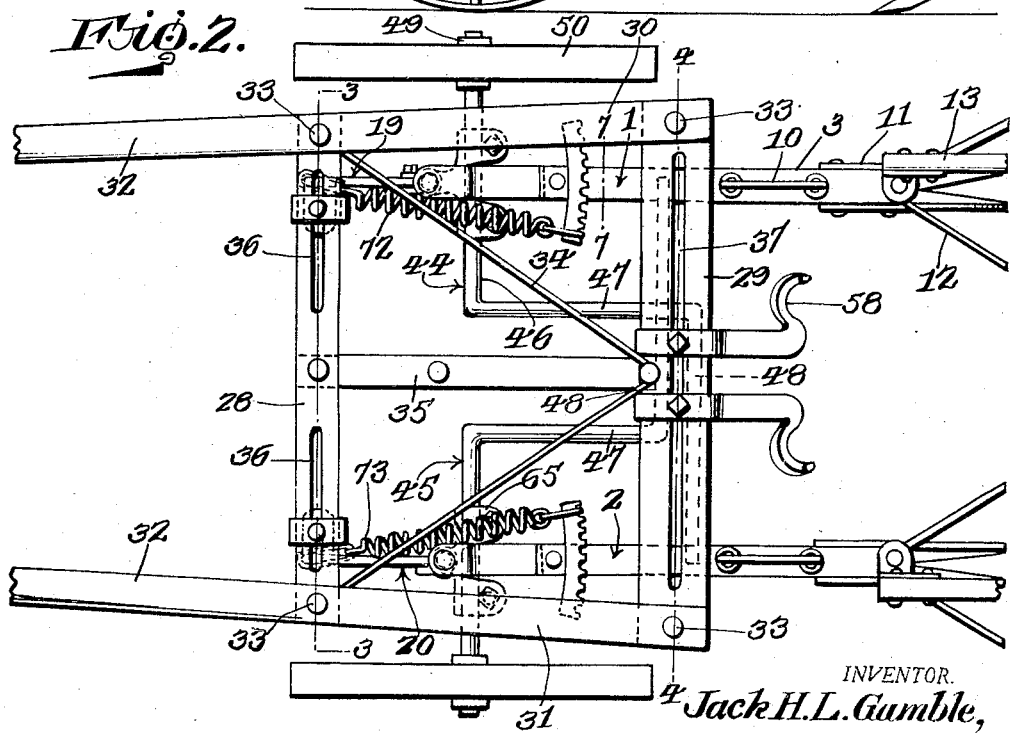
INVENTOR.
Jack H. L. Gamble,
BY
Geo. P. Kimmel
ATTORNEY.

May 12, 1931.　　　J. H. L. GAMBLE　　　1,805,394
STRADDLE ROW CULTIVATOR
Filed Oct. 10, 1929　　　2 Sheets-Sheet 2
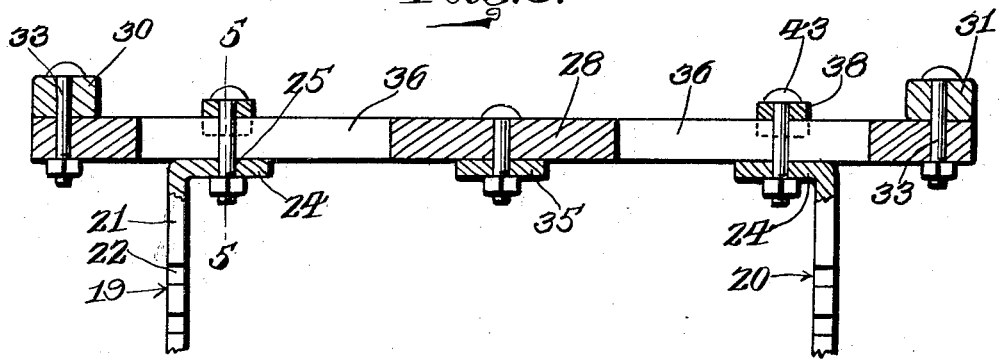
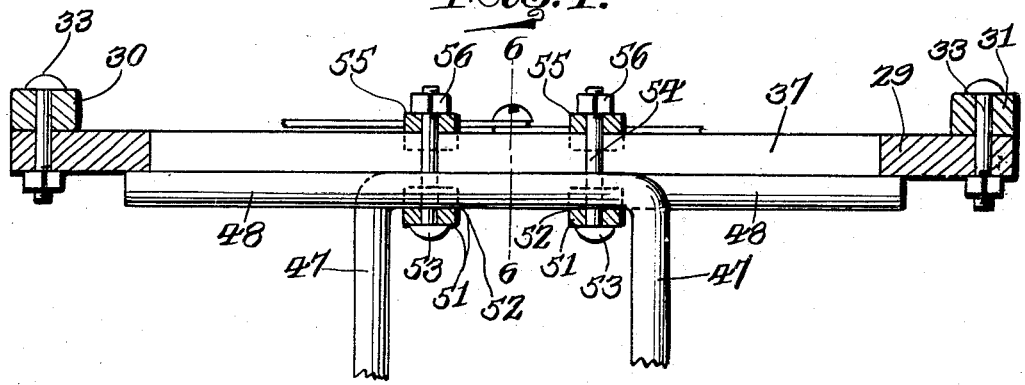
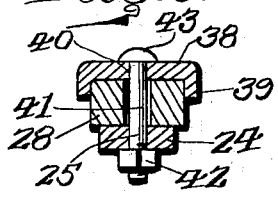
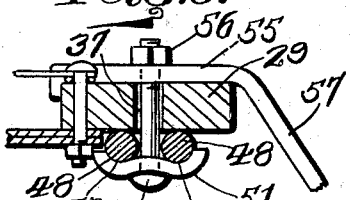
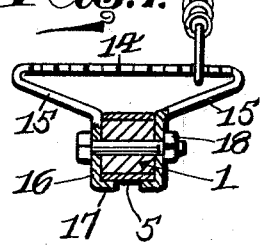
INVENTOR.
Jack H. L. Gamble,
BY
Geo. F. Kimmel
ATTORNEY.

Patented May 12, 1931

1,805,394

UNITED STATES PATENT OFFICE

JACK H. L. GAMBLE, OF HEADLAND, ALABAMA

STRADDLE ROW CULTIVATOR

Application filed October 10, 1929. Serial No. 398,699.

This invention relates to a straddle row cultivator and aims to provide, in a manner as hereinafter set forth, a ground working device of the class referred to which is simple in its construction and arrangement, strong, durable, compact, readily adjustable, thoroughly efficient in use, readily assembled, and comparatively inexpensive to manufacture.

A further object of the invention is to provide, in a manner as hereinafter set forth, a straddle row cultivator including a pair of spring controlled, pivoted beams for carrying the cultivator elements and further including adjustable means for increasing or decreasing the tension of the controlling springs for the beams.

A further object of the invention is to provide, in a manner as hereinafter set forth, a straddle row cultivator including a pair of beams carrying the cultivator elements and further including means whereby the beams can be quickly and conveniently hung up with the cultivator elements, when occasion requires.

A further object of the invention is to provide, in a manner as hereinafter set forth, a straddle row cultivator including means whereby a cultivating or plowing action can be had close up to stumps.

A further object of the invention is to provide, in a manner as hereinafter set forth, a straddle row cultivator including a two-part axle and with the latter so constructed as to permit of the parts thereof to be adjusted relatively to each other, to position the traction wheels of the cultivator at the desired point and further whereby the parts of the axle are fixedly secured in the position to which they have been adjusted.

A further object of the invention is to provide, in a manner as hereinafter set forth, a straddle row cultivator so constructed and arranged to enable the easy pulling thereof and furthermore including traction wheels therefor which can be arranged in close position to the animal pulling the cultivator.

A further object of the invention is to provide, in a manner as hereinafter set forth, a straddle row cultivator so constructed and arranged as to provide for the easy turning thereof and further permit of the pulling of the cultivator in close proximity to a fence.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a straddle row cultivator in accordance with this invention.

Figure 2 is a top plan view thereof.

Figure 3 is a fragmentary view on line 3—3 Figure 2.

Figure 4 is a fragmentary view on line 4—4 Figure 2.

Figure 5 is a section on line 5—5 Figure 3.

Figure 6 is a section on line 6—6 Figure 4.

Figure 7 is a fragmentary view on line 7—7 Figure 2.

Figure 8 is a fragmentary view in vertical section illustrating the joint connections between a beam and axle part and a brace part.

The cultivator includes a pair of beams 1, 2 each preferably consisting of a bar of wood 3 having secured to the upper and lower faces thereof metallic straps 4, 5 respectively, which project a substantial distance forwardly from the front end of the bar 3. The forwardly projecting portions of the straps 4, 5 are indicated at 6, 7 respectively and are oppositely disposed with respect to each other. Each projecting part of the strap includes an inclined portion which is disposed outwardly and a longitudinal portion which is arranged in a plane parallel to the plane of that part of the strap which is secured against bar 3. The longitudinally extending portions of the parts 6, 7 are indicated at 8 and they are arranged at the forward ends of the straps 4, 5. The inclined portions of the parts 6, 7 are indicated at 9 and are oppositely disposed.

Secured to each strap 4 in proximity to the rear end of the beam is a handle member 10. As illustrated, each side of a beam, at the rear thereof has secured thereto a standard 11 for a cultivating element, blade or plow 12. Each strap 4 has connected therewith a handle bar 13 for a beam.

Secured to each beam in proximity to its forward end and disposed transversely with respect thereto is a rack forming device comprising a horizontally disposed, toothed portion 14 which terminates in a pair of oppositely disposed arms, each consisting of an inwardly extending, inclined portion 15, a vertically extending portion 16 provided at its lower end with a flange 17 which abuts the strap 5. The portions 16 are positioned against the sides of the beams. See Figure 7. The portions 16 are secured to the beams by the holdfast device 18. The horizontally disposed toothed portion is spaced from the inclined portions 15 of the arms which project from the portion 14 and the latter forms a rack which is disposed transversely of and spaced above the beam. The purpose of the rack will be presently referred to.

The racks provided by the portions 14 are of materially greater length than the width of the beams and project laterally from both sides of the beams. The portions 14 also provide an anchor for a beam controlling spring which will be presently referred to.

The cultivator further includes a pair of upstanding brace members referred to generally at 19, 20, and as the brace members are of like construction but one will be described, as the description of one will apply to the other. The brace members are arranged forwardly of the beams 1, 2 and have their rear ends pivotally connected with the beams in a manner to be presently referred to. Each brace member includes a vertically disposed portion 21 having its forward end formed with a series of teeth 22 to provide a rack. Each brace member further includes a rearwardly directed curved portion 23 which projects from the lower part of portion 21. The upper end of portion 21 is formed with an inwardly extending, right angularly disposed flange 24 provided with an opening 25 for a purpose to be presently referred to. The lower end of portion 23 extends between the arms 26 of a yoke-shaped member 26', and the latter is secured to portion 23 by the holdfast device 27. The purpose of the member 28 will be presently referred to.

The cultivator further includes a balanced frame consisting of a front bar 28, a rear bar 29 and a pair of side bars 30, 31 which are extended forwardly to provide the shafts 32 of the cultivator. The bars 30, 31 are mounted upon the upper faces of the bars 28, 29 and fixedly connected therewith by the holdfast devices 33. A V-shaped brace 34 connects the ends of bar 28 to the center of bar 29 and a cross brace 35 is secured to the bars 28, 29 at the center thereof.

The bar 28 is of slightly less length than the bar 29, and is of less width than the width of bar 29. The bars 30, 31 incline from the bar 29 towards the bar 28, and the latter is formed with a pair of lengthwise extending, aligned, spaced slots 36, each of which is disposed between the transverse median and one end of bar 28. The bar 29 is provided with a lengthwise extending slot 37 which extends from a point in close proximity to one end of bar 29 and terminates at a point in close proximity to the other end thereof.

The inwardly extending flanges of the brace members 19 and 20 are positioned against the lower face of the bar 28 and extend across the slots 36. The upper ends of the brace members 19, 20 are adjustable lengthwise with respect to bar 28 and after being adjusted are rigidly secured in adjusted position. For the purpose of securing the brace members in adjusted position, relative to the bar 28 a retaining means is employed in connection with each brace member and as such retaining means are of like construction, but one will be described, as the description of one will apply to the other. Each retaining means includes a flanged clamping member 38 which is positioned above the top of bar 28. See Figure 5. The flanges 39 of the member 38 are positioned against the sides of the bar 28. The member 38 is formed with an opening 40 which aligns with the opening 25 formed in the flange 24. Extending through the aligning openings 40, 24 is a headed clamping bolt 41, the head of which seats upon the upper face of member 38. Mounted on the lower end of bolt 41 is a clamping nut 42, which bears against the lower face of flange 24. The head of the bolt 41 is indicated at 43. The clamping member 38, bolt 41 and nut 42 coact to fixedly maintain the clamping member in its adjusted position due to the manner in which the bolt 41 is connected with the flange 24 of the brace member.

The cultivator includes an axle formed of two parts generally indicated at 44, 45. The parts are oppositely disposed with respect to each other and are so set up whereby they can be adjusted relatively to each other, that is towards and away from each other. As each axle part is of like construction but one will be described, as the description of one will apply to the other. Each axle part is of Z-form and includes a lower portion 46, an intermediate portion 47, and an upper portion 48. Mounted on the outer end of portion 46 and retained thereon by collars 49 is a revoluble traction wheel 50. The intermediate portion 47 of each axle part extends upwardly and rearwardly at an inclination. The intermediate portion 47 of the axle part 44 extends a greater distance rearwardly than the intermediate portion 47 of the axle part 45. See Figure 1. The upper portion 48 of the axle part 45 is arranged forwardly of the upper portion 48 of the axle part 47. See Figure 2. The upper parts of the intermediate portions 47 of the axle parts are arranged below the bar 29 and the upper portion 48 of the axle part 45 is arranged forwardly of slot 37 and the upper portion 48 of axle part 44 is arranged rearwardly of slot 37. See Figure 2.

A pair of clamping devices are employed for fixedly securing the axle parts 44, 45 in adjusted position and the said clamping devices associate simultaneously with the upper portions 48 of the axle parts 44, 45. As each clamping device is of the same construction but one will be described, as the description of one will apply to the other. Each clamping device includes a clamping member 51. See Figure 6. The member 51 is provided on its upper face with a pair of seats 52 arranged in spaced relation and adapted to receive the upper portions 48 of the axle parts 44, 45. The clamping member 51' is seated upon the head 53 of a clamping bolt 54 which extends upwardly through the member 51 centrally thereof and also through the slot 37.

Mounted on top of a bar 29 and formed with an opening for the passage of the bolt 54 is the upper end of a forwardly directed strap 55 against which abuts a clamping nut 56 carried on the upper end of bolt 54. The strap 55 includes a downwardly inclined portion 57 which is arranged rearwardly of the bar 29 and has its lower end terminate in a laterally disposed hook 58. The hooks of the clamping devices are oppositely disposed with respect to each other. See Figure 2. The hooks 58 are adapted to receive the handle members 10 for the purpose of hanging up the beams 1, 2.

Each axle part has connected to its lower portion a coupling casting consisting of a vertically disposed body part 59 having its upper and lower portions 60, 61 positioned forwardly of its intermediate portion 62. The portion 61 has projecting forwardly therefrom a pair of spaced, apertured ears 63. The portion 61 has projecting forwardly therefrom a pair of spaced, apertured ears 64. Positioned in the intermediate portion 62 and projecting forwardly therefrom is the yoke-shaped member 28 which provides a barrel at the lower end of the portion 23 of a brace member. Projecting rearwardly from each side of the intermediate portion 62 is a pair of attaching ears 65 arranged in superposed relation and disposed at right angles with respect to the ears 63, 64. Each pair of clamping ears 65 is mounted upon the lower portion 46 of an axle part and retained thereon by the holdfast means 66, in a manner to permit of the coupling casting to swing on an axle part when desired. The coupling casting has its body portion arranged forwardly of the latter. See Figure 8.

Extending through the forward end portions 8 of the straps 4, 5 is a headed pivot bolt 67 carrying a securing nut 68 on its lower end. The head of the bolt is indicated at 69 and seats on the forward end portion 8 of the strap 4. The securing nut 68 abuts against the forward end portion 8 of the strap 5.

The bolt 67 is arranged forwardly of the body portion 59 and extends between the pair of ears 63, the pair of ears 64 and through the yoke-shaped member 28. The ears 63 are connected together by holdfast devices 70. The ears 64 are connected together by holdfast devices 71. The holdfast devices 70, 71 are arranged forwardly of the bolt 67. The arms of the member 26 are connected to the lower end of the portion 23 of the brace member by the holdfast devices 27. The bolt 69 is arranged between the lower end edge of portion 23 of a brace member and the base of the yoke-shaped member 26. See Figure 8. The foregoing construction provides for pivotally connecting a beam with the axle and brace member.

The toothed portion 21 of a brace member also provides an anchor for a controlling spring for a beam. The controlling spring for the beam 1 is indicated at 72 and the controlling spring for the beam 2 at 73. See Figure 2. The upper end of each controlling spring is provided with a loop 74 for connection to the toothed upper portion of a brace member. The lower end of each controlling spring is provided with a loop 75 for connection to the toothed portion 14 of the rack device. The purpose of the springs is to maintain the beams in the desired position so that the cultivator elements, blades or plows can act at the desired point. The toothed racks provided by the brace members permit of adjusting the upper ends of the controlling springs and the toothed portions 14 of the rack forming devices also permit of adjusting the lower ends of the springs. The brace members can also be adjusted relative to the bar 28 and when adjusted carry the upper portions of the controlling springs thereof.

Owing to the arrangement of the springs with respect to the racks to which they are connected they will act upon the beams to maintain them in the position desired.

Owing to the manner in which the axle parts are set up they can be shifted to position the traction wheels 50 at the points desired.

The axle parts, in connection with the brace members 19, 20 provide in connection with the coupling casting a balanced frame.

With a harrow on each beam the machine can harrow two rows at a time with the animal working between and not on the rows. Any type of harrow suitable for connection with the cultivator can be employed.

It is thought the many advantages of a straddle row cultivator, in accordance with this invention and for the purpose set forth can be readily understood, owing to the convenient adjustment of the tension applying means for the beams, the convenient manner in which the beams can be hung up and the ready adjustability of the axle part, and although the preferred embodiment of the invention is as illustrated and described, yet it is to be understood that changes in the details of construction can be had which will fall within the scope of the invention as claimed.

What I claim is:

1. In a straddle row cultivator, a frame including front rear and side bars, a two-part adjustable axle, said parts adjustable laterally relatively to each other, means for securing said axle to said rear bar and for maintaining the axle in its adjusted position, a pair of rearwardly directed spaced beams, a vertically disposed coupling element attached to and extended forwardly from each axle part, a pair of straps extending forwardly from each beam and opposing the top and bottom of a coupling element, a pivot bolt attached to each element and connecting a pair of straps to the latter, a yoke extending forwardly from each bolt intermediate the ends of the latter, a pair of depending rearwardly directed brace members having the upper ends thereof secured to said front bar and their lower ends to said yoke, said members being toothed, a rack extending transversely of each beam, and downwardly inclined spaced coiled springs for selective connection at their upper ends to the teeth of said members and at their lower ends to the teeth of said rack.

2. In a straddle row cultivator, a frame including front rear and side bars, a two-part adjustable axle, said parts adjustable laterally relatively to each other, means for securing said axle to said rear bar and for maintaining the axle in its adjusted position, a pair of rearwardly directed spaced beams, a vertically disposed coupling element attached to and extended forwardly from each axle part, a pair of straps extending forwardly from each beam and opposing the top and bottom of a coupling element, a pivot bolt attached to each element and connecting a pair of straps to the latter, a yoke extending forwardly from each bolt intermediate the ends of the latter, a pair of depending rearwardly directed brace members having the upper ends thereof secured to said front bar and their lower ends to said yoke, said members being toothed, a rack extending transversely of each beam, downwardly inclined spaced coiled springs for selective connection at their upper ends to the teeth of said members and at their lower ends to the teeth of said rack, said front bar formed with a pair of slots, and securing means extending through each slot to the upper end of a brace member, said securing means shiftable lengthwise of said slots for adjusting the position of the upper ends of said members relative to said front bar.

3. In a straddle row cultivator, a frame, an axle arranged below the frame and connected intermediate its ends to the rear of the frame, a pair of rearwardly directed beams, means for pivotally connecting the forward ends of said beams with said axle, a rack arranged over extending transversely of and secured to the beams in proximity to the forward end thereof, a pair of depending rearwardly directed brace members attached at their upper ends to the front of the frame, said members being toothed, a connection between the lower ends of each member and said means, and a pair of inclined coiled springs for selective connection at their upper ends to the teeth of said members and at their lower ends to the teeth of said rack.

4. In a straddle row cultivator, an axle formed of a pair of adjustable parts each including lower intermediate and upper portions, a frame including a front a rear and a pair of side bars, said lower portions positioned below said frame intermediate the front and rear of the latter and projecting from said side bars, means for adjustably securing the upper portions to said rear bar to maintain the axle in adjusted position, a pair of rearwardly extending beams provided at its front end with a pair of forwardly extending spaced superposed straps secured to and disposed longitudinally in relation to said beams, a pair of racks, each secured to and extending transversely of a beam, a vertically disposed coupling element attached to and projecting forwardly of each of said lower portions and arranged between the forward ends of a pair of straps, a pivot bolt attached to each of said elements and connecting the latter with a pair of straps, a forwardly extending yoke surrounding each pivot bolt, a pair of toothed depending rearwardly directed brace members secured at their upper ends to said front bars and at their lower ends attached to said yoke, and downwardly inclined coiled springs for selective connection at their upper ends to the teeth of said members and for selective connection at the lower ends to the teeth of said racks.

In testimony whereof, I affix my signature hereto.

JACK H. L. GAMBLE.